United States Patent
Wölzlein et al.

(10) Patent No.: US 12,466,762 B2
(45) Date of Patent: Nov. 11, 2025

(54) GLASS ARTICLE AND METHOD OF MAKING THE SAME

(71) Applicant: Schott AG, Mainz (DE)

(72) Inventors: Brigitte Wölzlein, Weidenbach (DE); Andre Petershans, Nabburg (DE)

(73) Assignee: Schott AG, Mainz (DE)

( * ) Notice: Subject to any disclaimer, the term of this patent is extended or adjusted under 35 U.S.C. 154(b) by 678 days.

(21) Appl. No.: 17/704,248

(22) Filed: Mar. 25, 2022

(65) Prior Publication Data
US 2022/0306518 A1   Sep. 29, 2022

(30) Foreign Application Priority Data

Mar. 25, 2021  (EP) ..................... 21164999
Aug. 17, 2021  (EP) ..................... 21191651

(51) Int. Cl.
| | |
|---|---|
| *C03C 3/091* | (2006.01) |
| *A61L 2/10* | (2006.01) |
| *A61L 2/26* | (2006.01) |
| *C03B 17/04* | (2006.01) |
| *C03C 1/00* | (2006.01) |
| *C03C 3/11* | (2006.01) |
| *C03C 3/118* | (2006.01) |
| *C03C 4/00* | (2006.01) |
| *C03C 21/00* | (2006.01) |
| *C03C 23/00* | (2006.01) |
| *C03C 10/00* | (2006.01) |

(52) U.S. Cl.
CPC .............. *C03C 3/091* (2013.01); *A61L 2/10* (2013.01); *A61L 2/26* (2013.01); *C03B 17/04* (2013.01); *C03C 1/00* (2013.01); *C03C 3/11* (2013.01); *C03C 3/118* (2013.01); *C03C 4/0085* (2013.01); *C03C 21/001* (2013.01); *C03C 23/007* (2013.01); *A61L 2202/11* (2013.01); *C03C 10/0018* (2013.01)

(58) Field of Classification Search
CPC ....... C03B 17/04; C03C 1/00; C03C 10/0018; C03C 21/001; C03C 2203/10; C03C 23/007; C03C 3/091; C03C 3/11; C03C 3/118; C03C 4/0085
See application file for complete search history.

(56) References Cited

U.S. PATENT DOCUMENTS

| | | |
|---|---|---|
| 5,045,509 A | 9/1991 | Kiefer |
| 5,547,904 A | 8/1996 | Watzke et al. |
| 2005/0109062 A1 | 5/2005 | Stelle et al. |

FOREIGN PATENT DOCUMENTS

| | | |
|---|---|---|
| JP | 2019-006643 A | 1/2019 |
| JP | 2020-100538 A | 7/2020 |

OTHER PUBLICATIONS

Jp2020100538A (Year: 2020).*
European Search Report dated Sep. 9, 2021 for European Patent Application No. 21164999.1 (5 pages).
(Continued)

*Primary Examiner* — Shuangyi Abu Ali
(74) *Attorney, Agent, or Firm* — TAYLOR & EDELSTEIN, PC

(57) ABSTRACT

One or more glass articles include an aluminum oxide containing silicate glass matrix. The glass matrix has less than 1 $SiO_2$-enriched glassy sphere of compositional inhomogeneities per 15 g of glass.

19 Claims, 2 Drawing Sheets

(56) References Cited

OTHER PUBLICATIONS

Herbert Insley, "Determination of the Source and the Means of Prevention of Stones in Glass", National Bureau of Standards, Journal of Research, vol. 2, No. 6, pp. 1077-1084, Jun. 30, 1929 (15 pages).

David A. Pierce, et al. "Effect of Alumina Source on the Rate of Melting Demonstrated with Nuclear Waste Glass Batch", International Journal of Applied Glass Science, vol. 3, No. 1, pp. 59-68, Feb. 8, 2012 (10 pages).

Jau-Ho Jean et al., "Alumina as a Devitrification Inhibitor during Sintering of Borosilicate Glass Powders", Journal of the American Ceramic Society, vol. 76, No. 8, pp. 2010-2016, Aug. 1, 1993 (7 pages).

English translation of Japanese Office Action dated Sep. 27, 2022 for Japanese Patent Application No. 2021-135577 (9 pages).

\* cited by examiner

GLASS ARTICLE AND METHOD OF MAKING THE SAME

CROSS REFERENCE TO RELATED APPLICATIONS

This application claims priority to European Patent Application No. EP 21191651.5 filed on Aug. 17, 2021, which is incorporated in its entirety herein by reference. This application also claims priority to European Patent Application No. EP 21164999.1 filed on Mar. 25, 2021, which is incorporated in its entirety herein by reference.

BACKGROUND OF THE INVENTION

1. Field of the Invention

The present invention relates to a method for the production of aluminum oxide containing silicate glass articles, particularly with a low alkaline content, with low risk of breakage even when undergoing extreme temperature changes. The method includes a hot-forming step which may comprise drawing the glass. The glass articles produced with the method provided according to the present invention are characterized by a very low level of SiO2-enriched glassy spheres of compositional inhomogeneities.

2. Description of the Related Art

A typical flaw which can occur in glass articles are glassy spheres of compositional inhomogeneities. These spheres are parts of a glass volume having a composition and a refraction index different from the rest of the glass matrix. Typically, such spheres may initially form around a piece of crystalline material, which may result from incomplete melting. Dissolution of crystalline material may take a long time and melting time may be insufficient to complete the melting process and form a homogenous glass matrix. While the piece of crystalline material may eventually dissolve during melting, the matrix may still have a local deviation of glass composition. Therefore, the glassy spheres of compositional inhomogeneities may have coefficients of thermal expansion which are different from those of the surrounding glass matrix.

As a consequence, a glassy sphere of compositional inhomogeneities may cause breakage of a glass article as it forms regions of tensile stresses within the matrix. The risk of breakage is higher, if the difference of thermal expansion between glass matrix and sphere is large.

Furthermore, the glassy spheres of compositional inhomogeneities may be disadvantageous at sub-breakage levels as well, in particular due to optical reasons. Glassy spheres of compositional inhomogeneities may simply be disliked for esthetic reasons in particular in highly expensive products that are associated with particular esthetic expectations. Moreover, glassy spheres of compositional inhomogeneities may also compromise the optical performance of glass articles that require homogeneous optical properties during use. For example, glassy spheres of compositional inhomogeneities are particularly disadvantageous in glass articles used in photo-multipliers as the spheres may result in scattering and/or absorption events that reduce the number of photons taking a pre-determined optical path.

There is a need for glass articles with low risk of breakage even when undergoing extreme temperature changes, such as glass articles used as lamp covers, or pharmaceutical packaging material suitable for autoclaving. At the same time these glass articles should also be characterized by chemically inert surfaces and high transparency, depending on the type of lamps, including transparency in the UV region. There is also a need for a method of making these glass articles.

SUMMARY OF THE INVENTION

In some exemplary embodiments provided according to the present invention, at least one glass article includes an aluminum oxide containing silicate glass matrix. The glass matrix has less than 1 $SiO_2$-enriched glassy sphere of compositional inhomogeneities per 15 g of glass.

In some exemplary embodiments provided according to the present invention, an ultraviolet (UV) lamp for disinfecting surfaces includes: a UV light emitter configured to emit UV light with a wavelength of between 200 nm and 280 nm; and a cover associated with the light emitter such that UV light emitted by the light emitter passes through the cover. The cover includes a glass having an aluminum oxide containing silicate glass matrix. The glass matrix has less than 1 $SiO_2$-enriched glassy sphere of compositional inhomogeneities per 15 g of glass.

In some exemplary embodiments, a method of making glass articles having an aluminum oxide containing silicate glass matrix is provided. The method includes: providing a batch of raw materials, including a source of aluminum oxide and a source of $SiO_2$, the source of aluminum oxide being gibbsite; melting the batch to a temperature of more than 1,500° C. for no less than 3 hours; forming a glass article from the melted batch; and cooling the glass article to room temperature. A glass matrix of the cooled glass article has less than 1 $SiO_2$-enriched glassy sphere of compositional inhomogeneities per 15 g of glass.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
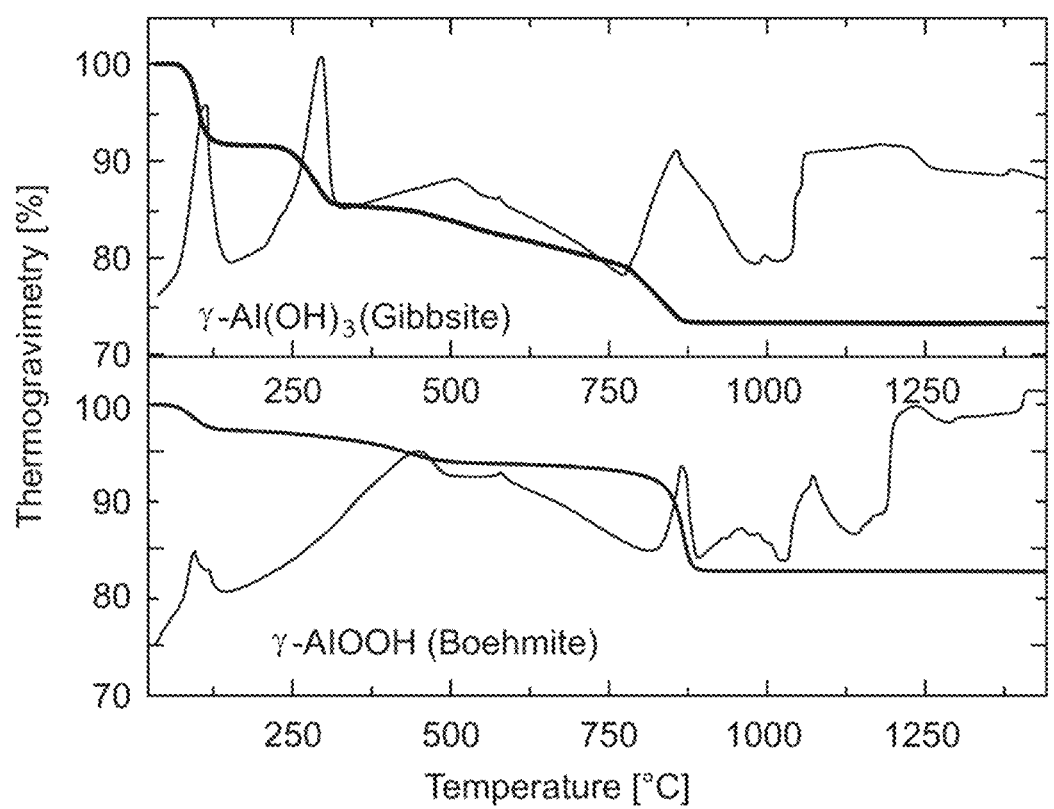
FIG. 1 is a DTA/TG plot of the thermoanalysis of gibbsite and boehmite.

The glassy spheres of compositional inhomogeneities (hereinafter abbreviated to "GCI spheres") are to be understood within the context of this application as comprising not only spherical shapes but also in particular ellipsoidal and spheroidal shapes having an aspect ratio of up to 2:1. However, they are explicitly not meant to comprise striae. Depending on the composition of the glass matrix, the GCI spheres predominantly, but not exclusively, occur close to the surface of the glass articles. Often they are transparent.

However, due to the refractive index being different from the surrounding glass matrix they can be seen in transmitted light. In this context, "transparent" refers to a transmittance of light over the whole visible range (380 to 740 nm) of at least 70% (measured at a thickness of 1 mm). This does not mean to limit the thickness of the glass or the GCI spheres to 1 mm, the thickness is just the reference thickness for the transmittance value. The size of the GCI spheres, measured by their largest diameter, may be more than 0.2 mm. In particular, the size may be more than 0.3 mm, more than 0.4 mm, or more than 0.5 mm. The size may be in the range of 0.2 mm-0.5 mm, 0.3 mm-0.6 mm, 0.4 mm-0.7 mm, or 0.5 mm-0.8 mm.

It was found that in alumina containing silicate glasses, local glass compositions within those GCI spheres are typically dominated by $SiO_2$. The $SiO_2$ proportion within the GCI spheres may be increased by at least 15% by weight or about 18-25% by weight when compared with the proportion of $SiO_2$ in the surrounding matrix. Hence, the present description generally refers to $SiO_2$-enriched GCI spheres. At temperatures above 1,470° C., $SiO_2$ will form cristobalite, a high temperature silica mineral polymorph. During melting, cristobalite particles will dissolve only very slowly. As a consequence, GCI spheres may be less of a problem in glasses with very high processing temperatures, such as some alumosilicate glasses, if processing temperatures are sufficiently high to dissolve cristobalite particles within short times. Other glasses cannot be melted at very high temperatures because volatile components may evaporate from the glass matrix.

Dissolution of cristobalite may involve migration of alkali metal ions that form eutectic mixtures with $SiO_2$. Therefore, cristobalite dissolution is slower, if alkali metal oxide levels in the glass matrix are low. Furthermore, the glass matrix around a dissolving (or dissolved) cristobalite particle may have large coefficients of thermal expansion comparable to those of alkali silicate glass. This explains why they form regions of tensile stresses within the matrix.

Typically, the $SiO_2$ content within the GCI spheres was found to range between 75% by weight and 99.5% by weight, depending on the composition of the glass matrix. It may be at least 75% by weight, at least 80% by weight, at least 85% by weight, at least 90% by weight, or at least 75% by weight. It may be at most 99.5% by weight, at most 99% by weight, at most 98% by weight, at most 97% by weight, at most 96% by weight, or at most 95% by weight. The local concentration of $SiO_2$ within an $SiO_2$-enriched GCI sphere may decrease from the core to the surface of the GCI sphere. If this is the case then the concentrations mentioned previously refer to the average concentration of the whole GCI sphere.

The "coefficient of thermal expansion" or "CTE" is the average linear coefficient of thermal expansion in a temperature range of from 20° C. to 300° C. It is determined according to DIN ISO 7991:1987. In the area of glasses, pure $SiO_2$ glass sets the extreme level for the coefficient of thermal expansion with about 0.5 ppm/K. Hence, the $SiO_2$-enriched GCI spheres may also have a coefficient of thermal expansion of as low as about 0.5 ppm/K. In order to avoid increased thermal tensile stress, the CTE of the glass matrix may be limited such that the thermal expansion is larger than the CTE of the GCI spheres by a factor of not more than 10.0, not more than 9.0, not more than 8.0, not more than 7.0 or not more than 6.0.

In some embodiments, the present invention addresses the previously mentioned problem of reduced stability of glass articles due to the presence of GCI spheres by providing a method for the production which uses a special source of aluminum oxide for the glass composition.

In some embodiments, the present invention relates to a method of making glass articles having an aluminum oxide containing silicate glass matrix, which may have a thermal conductivity of at least 0.75 $W \cdot m^{-1} \cdot K^{-1}$. The method includes:
  providing a batch of raw materials, comprising a source of aluminum oxide and a source of $SiO_2$,
  melting the batch to a temperature of more than 1,500° C. for no less than 3 hours,
  forming a glass article,
  cooling the glass article to room temperature,
wherein the source of aluminum oxide is gibbsite and the glass matrix of the cooled glass article has less than 1 $SiO_2$-enriched glassy sphere of compositional inhomogeneities per 15 g of glass.

The thermal conductivity ($(\lambda_w)$ at 90° C.) of the glass matrix may be at least 0.75 $W \cdot m^{-1} \cdot K^{-1}$, at least 0.80 $W \cdot m^{-1} \cdot K^{-1}$, at least 0.90 $W \cdot m^{-1} \cdot K^{-1}$, at least 0.92 $W \cdot m^{-1} \cdot K^{-1}$, at least 0.94 $W \cdot m^{-1} \cdot K^{-1}$, or at least 0.96 $W \cdot m^{-1} \cdot K^{-1}$. The thermal conductivity of the glass matrix may be at most 1.4 $W \cdot m^{-1} \cdot K^{-1}$, at most 1.35 $W \cdot m^{-1} \cdot K^{-1}$, at most 1.3 $W \cdot m^{-1} \cdot K^{-1}$, at most 1.25 $W \cdot m^{-1} \cdot K^{-1}$, at most 1.2 $W \cdot m^{-1} \cdot K^{-1}$, at most 1.18 $W \cdot m^{-1} \cdot K^{-1}$, at most 1.16 $W \cdot m^{-1} \cdot K^{-1}$, at most 1.14 $W \cdot m^{-1} \cdot K^{-1}$, at most 1.12 $W \cdot m^{-1} \cdot K^{-1}$, or at most 1.1 $W \cdot m^{-1} \cdot K^{-1}$. In some embodiments, the thermal conductivity of the glass article is in the same range because of the low number of GCI spheres, which generally have a less favorable thermal conductivity. The thermal conductivity ($\lambda_w$) is determined according to ASTM E1461:2013 as the product of the thermal diffusivity ($\alpha$), specific heat capacity ($c_p$) and density ($\rho$):

$$\lambda_w = \alpha \cdot c_p \cdot \rho$$

The thermal diffusivity ($\alpha$) is determined according to ASTM E1461:2013 by a laser flash method with a xenon flash light on specimens of cylindrical shape with a thickness of 1.0 mm and a diameter of 12.7 mm. Parametrization has been done using the Maier-Kelley method and a calculation model for transparent samples with pulse correction. The specific heat capacity ($c_p$) is determined by differential scanning calorimetry (DSC) according to DIN 51007:2019-04 (two separate samples, first sample 28° C.-400° C., second sample 28° C.-550° C., heating rate 10 K/min in an argon atmosphere, sample size about 90 mg). The density ($\rho$) is determined by the buoyancy method according to ASTM C 693:1993 (modified by use of a tenside addition to the water), wherein the temperature dependency of the density is calculated according to DIN ISO 7991:1998-02 (sample: cylindrical rod of 100 mm length and 5 mm diameter, temperature range: 25° C.-425° C. at a rate of 2 K/min).

The mineral gibbsite, which is also known under the names hydra(r)gillite or hydra(r)gyllite, is one of the four mineral forms of aluminum hydroxide $Al(OH)_3$. It is often also referenced by its chemical formula as $\gamma$-$Al(OH)_3$. The rock bauxite contains gibbsite as of one of its three main phases and is the most common source of gibbsite.

It has surprisingly been found that the level of GCI spheres within a glass article can very effectively be reduced if the material used as the source of aluminum oxide in the raw materials of the glass, in particular for glasses with very low thermal expansion coefficients, is gibbsite. Even despite low levels of alkali metal oxide and melting temperatures of more than 1,500° C. a level of less than 1 $SiO_2$-enriched GCI sphere can then still be achieved. As a consequence, the glass articles produced by this method show an excellent thermal stability making them particularly suitable for lamp covers or autoclavable pharmaceutical packaging material.

Without wishing to be bound by theory, the inventors consider that the aluminum hydroxide of the gibbsite improves the dissolution of the residual cristobalite particles. During the melting procedure of such alumosilicate glasses, excessive $SiO_2$ is present which finds no network partner and consequently is not incorporated into the network. Apparently, gibbsite promotes the formation of $SiO_2$-enriched networks in the glass matrix. Hence, the residual cristobalite particles will dissolve better.

Glass makers typically try to reduce levels of certain IR-absorbing components, like Ti, Fe, or $H_2O$. This results in a relatively low specific thermal capacity and high thermal conductivity of the glass. For example, the glasses produced according to the invention may have a thermal conductivity of at least 0.75 $W·m^{-1}·K^{-1}$. The glass melting tanks for the glass production are heated by burners. Hence, a reduced amount of IR-active components will reduce the heat which can be taken up by the glass. In case of irregularities or fluctuations in the burner, the glass will quickly drop in temperature. As a consequence, these glasses are very difficult to handle in the production, since they are very sensitive to temperature fluctuations which negatively influence the melting of the raw materials. The selected aluminum source improves the processing behavior and reduces the number of GCI spheres produced even though the glass contains low amounts of IR-absorbing components. In some embodiments, the glass may contain intermediate amounts of Ti and/or Fe, which may increase thermal capacity and/or thermal conductivity at least to some extent.

As the most common starting shape of a glass article used for lamp covers and autoclavable pharmaceutical packaging materials is a tube, in some embodiments provided according to the present invention the step of forming the glass article includes drawing a glass tube, optionally using the Danner tube drawing process.

The tube drawing process and the produced tubes, respectively, particularly benefit from the method provided according to the invention since the drawing process causes an even more pronounced deformation of the GCI spheres in the glass. The originally more or less spherical particles of cristobalite crystals formed in the melting process and the resulting spherical GCI spheres are stretched during the drawing process to a more elongated ellipsoidal or spheroidal shape. However, the drawing process only deforms the GCI spheres but will not cause the formation of striae. The aspect ratio of the shape may in those cases be shifted from about 1:1 to up to about 2:1. Because the elongated inhomogeneities lie in the direction of the longitudinal axis of the tube, the created tensile stresses within the matrix upon thermal expansion or contraction processes are particularly critical for breakage of the tubes. Hence, the quality of the glass articles and the reject rate will particularly profit from the process provided according to the invention if shaping them involves a drawing process. This is not restricted to the Danner process but also applies to other drawing methods like the Vello drawing process or the A-drawing process (down-draw process) for which the present invention is contemplated alike.

In some embodiments, the source of aluminum oxide has an average particle diameter D50 of from 20 µm to 300 µm, for example from 20 µm to 150 µm, from 25 µm to 140 µm, from 30 µm to 120 µm, or from 35 µm to 100 µm. In some embodiments, the average particle diameter D50 is at least 20 µm, at least 25 µm, at least 30 µm, at least 35 µm, or at least 40 µm. In some embodiments, the average particle diameter D50 is at most 90 µm, at most 100 µm, at most 110 µm, at most 120 µm, at most 130 µm, at most 140 µm, at most 150 µm, at most 175 µm, at most 200 µm, at most 225 µm, at most 250 µm, at most 275 µm, or at most 300 µm. The particle diameter D50 is measured by a dynamic light scattering method using a laser diffraction particle analyzer (e.g. a Microtrac X100) according to ISO 13320:2020-1. A particle size distribution within this range has proven itself advantageous in that it is an optimal range for handling, mixing, melting, and the reducing effect on the GCI spheres in the glass.

In some embodiments, the source of aluminum oxide has a BET surface area of less than 5.0 $m^2/g$ measured according to DIN ISO 9277:2014-01. In some embodiments, the BET surface area is less than 4.0 $m^2/g$, less than 3.0 $m^2/g$, less than 2.0 $m^2/g$, less than 1.0 $m^2/g$, less than 0.5 $m^2/g$, or less than 0.4 $m^2/g$. In some embodiments, the BET surface area is more than 0.1 $m^2/g$, more than 0.15 $m^2/g$, more than 0.2 $m^2/g$, or more than 0.25 $m^2/g$. The BET surface area is also an indicator of the porosity and the pore diameter of the particles. While a larger surface will facilitate solution and melting of the particles by increasing the contact surface, a smaller pore diameter will decrease the access of the melt to the particle surface. Hence, there exists an optimum value which should not be exceeded.

In some embodiments, the source of aluminum oxide has a density of less than 2.600 $g/cm^3$. In some embodiments, the density is less than 2.590 $g/cm^3$, less than 2.580 $g/cm^3$, less than 2.570 $g/cm^3$, less than 2.560 $g/cm^3$, less than 2.550 $g/cm^3$, less than 2.540 $g/cm^3$, or less than 2.530 $g/cm^3$. A lower density is characterized by a less perfect crystal structure. The more faults there are in the crystal lattice, the lower is the energy level required for melting and, hence, the easier and faster the particles are melted.

In the method provided according to the invention, in some embodiments, the temperature of the melt does not exceed 1,700° C. The temperature of the melt in some embodiments does not exceed 1,680° C., 1,660° C., 1,640° C., 1,620° C., or 1,600° C.

In some embodiments, the aluminum oxide source contains at least 0.015% by weight of sodium (Na) (determined by Atomic Absorption Spectroscopy (AAS)). The aluminum oxide source may contain at least 0.03% by weight of Na, at least 0.045% by weight of Na, at least 0.06% by weight of Na, at least 0.075% by least of Na, at least 0.1% by weight of Na, at least 0.15% by weight of Na, or at least 0.2% by weight of Na. Like explained previously, a faulty crystal lattice will be beneficial for the melting process and facilitate melting. Hence, a certain amount of sodium impurities in the aluminum source may help to reduce the number of GCI spheres in the glass, since the aluminum source particles will melt at lower temperatures and more readily.

In a further aspect, the present invention relates to the use of gibbsite as a source of aluminum oxide for making a glass article having an aluminum oxide containing silicate glass matrix.

In yet a further aspect, the present invention relates to a glass article comprising an aluminum oxide containing silicate glass matrix, the glass matrix having less than 1 $SiO_2$-enriched glassy sphere of compositional inhomogeneities per 15 g of glass. In some embodiments, the glass article has less than 1 $SiO_2$-enriched glassy sphere of compositional inhomogeneities per 25 g of glass, per 50 g of glass, or per 100 g of glass.

In some embodiments, the glass article may have one or more SiO$_2$-enriched glassy sphere of compositional inhomogeneities per 1.000 g of glass, per 900 g of glass, or per 800 g of glass.

The SiO$_2$-enriched GCI sphere in the glass article may have an aspect ratio of from 1:1 to 1.1:1, from 1:1 to 1.2:1, from 1:1 to 1.3:1, from 1:1 to 1.4:1, from 1:1 to 1.5:1, from 1:1 to 1.6:1, from 1:1 to 1.7:1, from 1:1 to 1.8:1, from 1:1 to 1.9:1, or from 1:1 to 2.0:1. The aspect ratio may, for example, be at least 1.1:1, 1.2:1, 1.3:1, 1.4:1, 1.5:1, 1.6:1, 1.7:1, 1.8:1, or 1.9:1. The aspect ratio may, for example, be at most 1.2:1, 1.3:1, 1.4:1, 1.5:1, 1.6:1, 1.7:1, 1.8:1, 1.9:1, or 2.0:1.

In some embodiments provided according to the present invention, the glass matrix contains B$_2$O$_3$. In some embodiments, it contains B$_2$O$_3$ in an amount of 3.0 mol-% or more, 4.0 mol-% or more, 5.0 mol-% or more, 6.0 mol-% or more, 7.0 mol-% or more, 8.0 mol-% or more, 9.0 mol-% or more, or 10.0 mol-% or more.

In some embodiments provided according to the present invention, the glass matrix contains B$_2$O$_3$ in an amount of more than 15.0 mol-%, more than 16.0 mol-%, more than 17.0 mol-%, more than 18.0 mol-%, more than 19.0 mol-%, or more than 20.0 mol-%.

In some embodiments provided according to the present invention, the glass matrix contains less than 12.0 mol-% of alkali metal oxides. In some embodiments, the glass matrix contains less than 11.0 mol-%, less than 10.0 mol-%, or less than 9.0 mol-% of alkali metal oxides.

In some embodiments provided according to the present invention, the glass matrix has a coefficient of thermal expansion of less than 5.0 ppm/K. In some embodiments, the coefficient of thermal expansion is less than 4.5 ppm/K, less than 4.0 ppm/K, less than 3.5 ppm/K, or less than 3.0 ppm/K.

In another aspect, the present invention relates to a glass article that is obtainable by the method provided according to the present invention.

In some embodiments, the glass article may be in tube shape.

In some embodiments provided according to the present invention, the glass article has a UV transmittance of at least 60% at 200 nm and/or at least 83% at wavelengths [λ] of 254 nm, 280 nm and/or 310 nm (measured at a thickness of 1 mm). The UV transmittance may be at least 86% or at least 88% at wavelengths [λ] of 254 nm, 280 nm and/or 310 nm. This does not mean to limit the thickness of the glass to 1 mm; the thickness is just the reference thickness for the transmittance value.

In some embodiments provided according to the present invention, the glass article has a maximum deviation of UV transmittance at 254 nm and/or 200 nm over an area of at least 10 cm$^2$ of not more than 5.0%, not more than 3.0% or not more than 1.0%. The maximum deviation can be measured by determining the UV transmittance of an area of the glass article and calculating the difference between the maximum and minimum values.

In another aspect, the present invention relates to a set of the glass articles comprising from 5 to 5,000 glass articles. The set may comprise at least 10, 30, 50, 70, 90, 100, 150, 200, 250, or 500 glass articles. The set may comprise at most 4,500, 4,000, 3,500, 3,000, 2,500, 2,000, 1,500, or 1,000 glass articles. Glass articles used for medical packaging and lamps or sensors are often used in sets of desired uniform properties within the sets. With the method provided according to the present invention, such sets of glass articles may be produced having a very low variance in the properties. In particular, sets having good optical transmission properties, transparency, and mechanical stability under thermal stress may be produced.

Glass Composition

The glass may be a boroalumosilicate glass. In some embodiments, boroalumosilicate glass comprises the following components (in mol-% based on oxides):

| | |
|---|---|
| SiO$_2$ | 60-78 |
| Al$_2$O$_3$ | 1.0-10 |
| B$_2$O$_3$ | 12-24 |
| Li$_2$O | 0-3.0 |
| Na$_2$O | 0-6 |
| K$_2$O | 0-4 |
| MgO | 0-6 |
| CaO | 0-6 |
| SrO | 0-4 |
| BaO | 0-4 |
| F$^-$ | 0-6 |
| Cl$^-$ | 0-0.5 |
| R$_2$O | 3.5-10 |
| RO | 0-6 |

The glasses provided according to the present invention may contain SiO$_2$ in a proportion of at least 60 mol-%. SiO$_2$ contributes to the hydrolytic resistance and transparency of the glass. If the SiO$_2$ content is too high, the melting point of the glass is too high. The temperature T$_4$ and Tg also rise sharply. Therefore, the content of SiO$_2$ should be limited to a maximum of 78 mol-%.

In some embodiments, the content of SiO$_2$ is at least 61 mol %, at least 63 mol-% or at least 65 mol-%. The content can be limited to a maximum of 75 mol-% or a maximum of 72 mol-%.

The glasses provided according to the present invention contain Al$_2$O$_3$ in a maximum proportion of 10 mol-%. Al$_2$O$_3$ contributes to the segregation stability of the glasses, but in larger proportions reduces the acid resistance. Furthermore, Al$_2$O$_3$ increases the melting temperature and T$_4$. Thus the content of this component may be limited to a maximum of 9 mol-% or a maximum of 8 mol-%. In some embodiments Al$_2$O$_3$ is used in a small proportion of at least 1.0 mol-%, at least 1.5 mol-%, at least 2 mol-%, at least 2.5 mol-%, or at least 3 mol-%, or at least 3.5 mol-%.

The glasses provided according to the present invention may contain B$_2$O$_3$ in a proportion of at least 12 mol-%. B$_2$O$_3$ has a beneficial effect on the melting properties of glass, in particular the melting temperature is lowered and the glass can be fused with other materials at lower temperatures. However, the amount of B$_2$O$_3$ should not be too high, otherwise the glasses have a strong tendency to segregation. Thus, B$_2$O$_3$ should be limited to up to 24 mol-%, up to 22 mol %, or up to 20 mol-%. In some embodiments, the content of B$_2$O$_3$ is a maximum of 17 mol-%. The content of B$_2$O$_3$ can be at least 12 mol-%, or at least 14 mol-%.

In some embodiments, the ratio of the sum of the contents (in mol-%) of B$_2$O$_3$, R$_2$O and RO to the sum of the contents (in mol-%) of SiO$_2$ and Al$_2$O$_3$ is at most 0.4, for example at most 0.35 or at most 0.33. In some embodiments, this value is at least 0.1, for example at least 0.2 or at least 0.26. Glasses with the above-mentioned proportion have good properties in terms of hydrolytic resistance and segregation factor, and they have only a low induced extinction, which has many advantages, especially when used as UV-transparent material.

The glasses provided according to the present invention may contain Li$_2$O in a proportion of up to 3.0 mol-%, up to 2.8 mol-%, or up to 2.5 mol-%. Li$_2$O increases the fusibility of the glasses and results in a beneficial shift of the UV edge to lower wavelengths. However, lithium oxide tends to evaporate, increases the tendency to segregation and also increases the price of the mixture. In some embodiments, the glass contains only a small amount of $Li_2O$, e.g. maximum 3.0 mol-%, maximum 2.0 mol-%, or maximum 1.9 mol-%, or the glass is free of $Li_2O$.

The glasses provided according to the invention contain $Na_2O$ in a proportion of up to 6 mol-%. $Na_2O$ increases the fusibility of the glasses. However, sodium oxide also leads to a reduction in UV transmission and an increase in the coefficient of thermal expansion. The glass may contain $Na_2O$ in a proportion of at least 1 mol %, or at least 2 mol-%. In some embodiments, the content of $Na_2O$ is maximum 5 mol %, or maximum 4 mol-%.

The glasses provided according to the present invention contain $K_2O$ in a maximum proportion of 4 mol-%. $K_2O$ increases the fusibility of the glasses and results in a beneficial shift of the UV edge to lower wavelengths. Its content may be at least 0.3 mol-% or at least 0.75 mol-%. However, a potassium oxide content that is too high leads to a glass that has a disturbing effect when used in photomultipliers due to the radiating property of its isotope $^{40}K$. Therefore, the content of this component may be limited to a maximum of 3 mol %, or a maximum of 2 mol-%.

In some embodiments, the ratio of the contents of $Na_2O$ to $K_2O$ in mol-% is at least 1.5, for example at least 2. In some embodiments, the said ratio is at most 4, for example at most 3. Both oxides serve to improve the fusibility of the glass. However, if too much $Na_2O$ is used, the UV transmission is reduced. Too much $K_2O$ increases the coefficient of thermal expansion. It was found that the ratio given achieves the best results, i.e. the UV transmission and the coefficient of thermal expansion are in advantageous ranges.

The amount of $R_2O$ in the glasses provided according to the present invention is, in some embodiments, not more than 10 mol-%, not more than 8 mol-% or not more than 7 mol-%. The glasses may contain $R_2O$ in amounts of at least 3.5 mol %, at least 4 mol-% or at least 4.5 mol-%. Alkali metal oxides increase the fusibility of the glasses, but, as described previously, lead to various disadvantages in higher proportions.

The glasses provided according to the present invention may contain MgO in a proportion of up to 4 mol-% or up to 2 mol-%. MgO is advantageous for fusibility, but in high proportions it proves to be problematic with regard to the UV transmission and the tendency to segregation. In some embodiments, the glasses are free of MgO.

The glasses provided according to the present invention may contain CaO in a proportion of up to 4 mol-% or up to 2 mol-%. CaO is advantageous for fusibility, but in high proportions it proves to be problematic with regard to the UV transmission. In some embodiments, the glasses are free of CaO or contain only little CaO, e.g. at least 0.1 mol %, at least 0.3 mol-% or at least 0.5 mol-%.

The glasses provided according to the present invention may contain SrO in a proportion of up to 4 mol-%, up to 1 mol-% or up to 0.5 mol-%. SrO is advantageous for fusibility, but in high proportions it proves to be problematic with regard to the UV transmission. In some embodiments, the glasses are free from SrO.

The glasses provided according to the present invention may contain BaO in a proportion of up to 4 mol-% or up to 2 mol-%. BaO leads to an improvement of the hydrolytic resistance. However, a too high barium oxide content leads to segregation and thus to instability of the glass. In some embodiments, the glasses contain BaO in amounts of at least 0.1 mol-%, at least 0.3 mol-% or at least 0.8 mol-%.

It has been shown that the alkaline earth oxides RO have a great influence on the segregation tendency. In some embodiments, special attention is therefore paid to the contents of these components and their relationship to one another. Thus, the ratio of BaO in mol-% to the sum of the contents of MgO, SrO and CaO in mol-% should be at least 0.4. In some embodiments, this value is at least 0.55, at least 0.7 or at least 1.0. In some embodiments, the value is at least 1.5 or even at least 2. BaO offers the most advantages in terms of segregation and hydrolytic resistance compared to the other alkaline earth metal oxides. However, the ratio should not exceed 4.0 or 3.0. In some embodiments, the glass contains at least small amounts of CaO and BaO and is free of MgO and SrO.

Advantageous properties may be obtained if the ratio of the proportion of CaO in the glass to BaO in mol-% is less than 2.0. In some embodiments, this ratio should be less than 1.5 or less than 1.0. Some exemplary ratios are even lower, in particular less than 0.8, or less than 0.6, and in some embodiments this ratio is at least 0.3.

In some embodiments, the glass has a mol-% ratio of $B_2O_3$ to BaO of at least 8 and at most 20. In some embodiments, the ratio is at least 10, or at least 11 and, in some embodiments, the said ratio is limited to a maximum of 18, 16, 15 or 13. In some embodiments, the ratio is not less than 10 and not more than 15, or not less than 11 and not more than 13; glasses with the above ratio show good properties in terms of hydrolytic resistance and segregation factor, as well as low induced absorbance.

The proportion of RO in the glasses provided according to the present invention can be at least 0.3 mol-%. Alkaline earth metal oxides are advantageous for fusibility, but in high proportions they prove to be problematic with regard to the UV transmission. In some embodiments, the glass contains a maximum of 3 mol-% RO.

The sum of the contents in mol-% of alkaline earth metal oxides and alkali metal oxides, RO+R2O, can be limited to a maximum of 10 mol-%. Exemplary embodiments can contain these components in quantities of maximum 9 mol-%. In some embodiments, the content of these oxides is at least 4 mol-%, at least 5 mol-% or at least 6 mol-%. These components increase the segregation tendency and reduce the hydrolytic resistance of the glasses in too high proportions.

The ratio of the contents in mol-% of $B_2O_3$ to the sum of the contents of $R_2O$ and RO in mol-% may be at least 1.3, at least 1.5 or at least 1.8. The ratio can be limited to a maximum of 6, a maximum of 4.5 or a maximum of 3. Alkali or alkaline earth borates can form during glass segregation, if too much alkali or alkaline earth oxide is present in relation to $B_2O_3$. It has proved to be advantageous to adjust the above ratio.

To ensure that the melting properties, including Tg and $T_4$, are within the desired range, it may be advantageous to set the ratio of the content of $B_2O_3$ to the sum of the contents of $SiO_2$ and $Al_2O_3$ in mol-% within a narrow range. In some embodiments, this ratio is at least 0.15 and/or at most 0.4.

The ratio of the proportions in mol-% of the sum of the alkali metal oxides $R_2O$ to the sum of the alkaline earth metal oxides RO may be >1, for example >1.1 or >2. In some embodiments, this ratio is at most 10, at most 7 or at most 5.

The glasses provided according to the present invention may contain $F^-$ in a content of 0 to 6 mol-%. In some embodiments, the content of $F^-$ is at most 4 mol-%. In some embodiments, at least 1 mol-% or at least 2 mol-% of this component is used. Component F⁻ improves the fusibility of the glass and influences the UV edge towards smaller wavelengths.

The glasses provided according to the present invention may contain Cl⁻ in a content of less than 1 mol %, for example less than 0.5 mol-% or less than 0.3 mol-%. Suitable lower limits are 0.01 mol-% or 0.05 mol-%.

As mentioned previously, the glass may contain intermediate amounts of IR-absorbing compounds such as Fe and Ti in order to improve melting. The glasses provided according to the present invention may contain Fe₂O₃ in an amount of from 1 ppb to 10 ppm, from 10 ppb to 9 ppm, from 20 ppb to 8 ppm, from 30 ppb to 7 ppm, from 40 ppb to 6 ppm, or from 50 ppb to 5 ppm. The amount of Fe₂O₃ may be at least 1 ppb, at least 10 ppb, at least 20 ppb, at least 30 ppb, at least 40 ppb, or at least 50 ppb. The amount of Fe₂O₃ may be at most 10 ppm, at most 9 ppm, at most 8 ppm, at most 7 ppm, at most 6 ppm, or at most 5 ppm.

The glasses provided according to the present invention may contain TiO₂ in an amount of from 1 ppb to 10 ppm, from 10 ppb to 9 ppm, from 20 ppb to 8 ppm, from 30 ppb to 7 ppm, from 40 ppb to 6 ppm, or from 50 ppb to 5 ppm. The amount of TiO₂ may be at least 1 ppb, at least 10 ppb, at least 20 ppb, at least 30 ppb, at least 40 ppb, or at least 50 ppb. The amount of TiO₂ may be at most 10 ppm, at most 9 ppm, at most 8 ppm, at most 7 ppm, at most 6 ppm, or at most 5 ppm.

When this description states that the glass is free of a component or does not contain a certain component, it means that this component may at most be present as an impurity. This means that it is not added in significant quantities. Non-significant quantities are quantities of less than 0.5 ppm, such as less than 0.25 ppm or less than 0.125 ppm.

In some embodiments, the glass has less than 3.5 ppm arsenic, for example less than 2.5 ppm or less than 1.0 ppm. In some embodiments, the glass contains less than 3.5 ppm antimony, less than 2.5 ppm antimony, or less than 1.0 ppm antimony. Besides the negative effects on UV-transmission and solarization, arsenic and antimony are toxic and dangerous to the environment and should be avoided.

In some embodiments, borosilicate glass includes the following components (in mol-% on oxide basis):

|  |  |
| --- | --- |
| $SiO_2$ | 68-73 |
| $Al_2O_3$ | 2-5 |
| $B_2O_3$ | 12-18 |
| $Na_2O$ | 1-4 |
| $K_2O$ | 0-2 |
| CaO | >0-2 |
| SrO | 0-1 |
| BaO | 0-4 |
| F⁻ | 0-6 |

In some embodiments, the glass includes the following components in mol-%:

|  |  |
| --- | --- |
| $SiO_2$ | 68-73 |
| $Al_2O_3$ | 3-5 |
| $B_2O_3$ | 12-18 |
| $Li_2O$ | 0-2.8 |
| $Na_2O$ | 1-4 |
| $K_2O$ | 0-2 |
| CaO | >0-2 |
| SrO | 0-1 |
| BaO | >0-4 |
| F⁻ | 0-6 |

Articles

In some embodiments, the thickness of the glass article, such as the wall thickness in the case of a glass tube, can be at least 0.1 mm or at least 0.3 mm. The thickness can be limited to up to 3 mm or up to 2 mm. The outside diameter of the glass article, e.g. the outside diameter of a glass tube or glass rod, can be up to 50 mm, up to 40 mm, or up to 30 mm. The outside diameter can be at least 1 mm, at least 2 mm, or at least 3 mm. In some embodiments, the article has a thickness that is at least 3 mm and/or at most 20 mm. Optionally, the thickness is at least 5 mm, at least 6 mm, or at least 8 mm. The thickness may be limited to a maximum of 20 mm, up to 16 mm, up to 14 mm, or up to 12 mm. In some embodiments, the article has a length and a width, with the length being greater than the width. The length may be at least 20 mm, at least 40 mm or at least 60 mm. Optionally, it is at most 1000 mm, at most 600 mm, at most 250 mm or at most 120 mm. In some embodiments, the length is from 20 mm to 1000 mm, from 40 mm to 600 mm, or from 60 mm to 250 mm. The width may be at least 10 mm, at least 25 mm, or at least 35 mm. Optionally, the width is at most 575 mm, at most 225 mm or at most 110 mm. In some embodiments, the width is from 10 mm to 575 mm, from 25 mm to 225 mm, or from 35 mm to 110 mm. In some embodiments, the article is in the form of a sheet or a disc.

In an aspect, the invention relates to a glass articles comprising or consisting of the glass described herein. In some embodiments, the glass article has at least one polished surface. Optionally, the glass article has at least one chamfered edge. The polished surface may have a surface roughness Ra of less than 10 nm or less than 5 nm. Chamfered edges are more impact resistant, in particular more resistant to chipping than non-chamfered edges.

Thermal and/or Chemical Tempering

Optionally, the manufacturing process comprises the step of chemical and/or thermal tempering of the glass article. The "tempering" is also referred to as "hardening" or "toughening".

In some embodiments, the glass article is toughened on at least one surface, for example thermally and/or chemically toughened. For example, it is possible to chemically temper glass articles by ion exchange. In this process, small alkali ions in the article are usually replaced by larger alkali ions. Often, the smaller sodium is replaced by potassium. However, it is also possible that the very small lithium is replaced by sodium and/or potassium. Optionally, it is possible that alkali ions are replaced by silver ions. Another possibility is that alkaline earth ions are exchanged for each other according to the same principle as the alkali ions. In some embodiments, the ion exchange takes place in a bath of molten salt between the article surface and the salt bath. Pure molten salt, for example molten KNO₃, can be used for the exchange. However, salt mixtures or mixtures of salts with other components can also be used. The mechanical resistance of an article can further be increased if a selectively adjusted compressive stress profile is built up within the article. This can be achieved by mono- or multistage ion exchange processes.

By replacing small ions with large ions or by thermal tempering, a compressive stress is created in the corresponding zone, which drops from the surface of the glass article towards the center. The maximum compressive stress is just below the glass surface and is also referred to as CS (compressive stress). CS is a stress and is expressed in units of MPa. The depth of the compressive stress layer is abbreviated as "DoL" and is given in the unit μm. In some embodiments, CS and DoL are measured using the FSM-60LE apparatus from Orihara.

In some embodiments, CS is greater than 100 MPa. In some embodiments, CS is at least 200 MPa, at least 250 MPa, or at least 300 MPa. In some embodiments, CS is at most 1,000 MPa, at most 800 MPa, at most 600 MPa, or at most 500 MPa. In some embodiments, CS is in a range from >100 MPa to 1,000 MPa, from 200 MPa to 800 MPa, from 250 MPa to 600 MPa, or from 300 MPa to 500 MPa.

In some embodiments, the glass article is thermally toughened. Thermal toughening is typically achieved by rapid cooling of the hot glass surface. Thermal toughening has the advantage that the compressive stress layer can be formed deeper (larger DoL) than with chemical toughening. This makes the glasses less susceptible to scratching, since the compressive stress layer cannot be penetrated as easily with a scratch as with a thinner compressive stress layer.

The glasses or glass articles can, for example, be subjected to a thermal tempering process after a melting, shaping, annealing/cooling process and cold post-processing steps. In this process, glass bodies (e.g. a previously described glass article or a preliminary product), for example flat glass, may be fed horizontally or suspended into a device and rapidly heated to a temperature up to a maximum of 150° C. above the transformation temperature $T_G$. The surfaces of the glass body are then rapidly cooled, for example by blowing cold air through a nozzle system. As a result of the rapid cooling of the glass surfaces, they are frozen in an expanded network, while the interior of the glass body cools slowly and has time to contract more. This creates a compressive stress in the surface layer and a tensile stress in the interior. The amount of compressive stress depends on various glass parameters such as $CTE_{glass}$ (average linear coefficient of thermal expansion below Tg), $CTE_{liquid}$ (average linear coefficient of thermal expansion above Tg), strain point, softening point, Young's modulus and also on the amount of heat transfer between the cooling medium and the glass surface as well as the thickness of the glass bodies.

In some embodiments, a compressive stress of at least 50 MPa is generated. As a result, the flexural strength of the glass bodies can be doubled to tripled compared to non-toughened glass. In some embodiments, the glass is heated to a temperature of 750 to 800° C. and tempered fast in as stream of cold air. Optionally, the blowing pressure may be from 1 to 16 kPa. With the glasses or glass articles described herein, values of compressive stress of 50 to 250 MPa, such as 75 to 200 MPa, for example, are achieved on commercially available systems.

In some embodiments, the glass article has a compressive stress layer with a compressive stress of at least 50 MPa, for example at least 75 MPa, at least 85 MPa or at least 100 MPa. The glass article may have a compressive stress layer on one, two or all of its surfaces. The compressive stress of the compressive stress layer may be limited to at most 250 MPa, at most 200 MPa, at most 160 MPa or at most 140 MPa. These compressive stress values may be present, for example, in thermally toughened glass articles.

In some embodiments, the depth of the compressive stress layer of the glass article is at least 10 μm, at least 20 μm, at least 30 μm, or at least 50 μm. In some embodiments, this layer may even be at least 80 μm, at least 100 μm, or at least 150 μm. Optionally, the DoL is limited to at most 2,000 μm, at most 1,500 μm, at most 1,250 μm, or at most 1,000 μm. In some embodiments, the DoL can be from 10 μm to 2,000 μm, from 20 μm to 1,500 μm, or from 30 μm to 1,250 μm. In some embodiments, the glass article is thermally toughened with a DoL of at least 300 μm, at least 400 μm or at least 500 μm. Optionally, the DoL may be at most 2,000 μm, at most 1,500 μm, or at most 1,250 μm. In some embodiments, the DoL is from 300 μm to 2,000 μm, from 400 μm to 1,500 μm, or from 500 μm to 1,250 μm.

EXEMPLARY EMBODIMENTS

The present invention relates to a glass that is resistant in several respects. Particularly resistant glass is especially useful where the glass is exposed to special requirements. This is the case, for example, in extreme environments. Extreme environments are in particular areas of application in which special resistance, durability and safety are required, e.g. areas requiring explosion protection.

In some embodiments, the invention relates to a glass article with special suitability for use in extreme environments. The article may be a sheet, disc, tube, rod, ingot or block.

Optionally, the glass article comprises an aluminum oxide containing silicate glass matrix, the glass matrix having less than 1 $SiO_2$-enriched glassy sphere of compositional inhomogeneities per 15 g of glass, further wherein the glass article has a thickness of at least 0.3 mm, for example at least 3 mm and/or up to 20 mm.

In extreme environments, it may be useful to provide a certain minimum thickness for the glass article, since thicker glasses are mechanically more stable than thinner glasses. However, thicker glass absorbs a greater portion of the UV radiation entering the glass, resulting in the generation of heat. In environments with highly flammable materials, high heat generation can be problematic. A glass article with low induced extinction at 200 nm and/or 254 nm offers the advantage that transmission remains high for the wavelengths under consideration, even after extended use, and extreme heat generation is avoided.

According to the invention, the glass article can also be used in a UV lamp for disinfecting surfaces in extreme environments. In some embodiments, the glass article is used in a UV lamp (particularly as a cover) that is used to disinfect a site of action. The site of action may be an object that is touched by many people, for example a handle, in particular a door handle. The UV lamp can, for example, be aligned in such a way that it applies UV radiation to the site of action. In this case, a certain proximity to the site of action cannot be avoided. Accordingly, there is a risk here that the glass article will be damaged by impacts. This results in a need for mechanical resistance. The mechanical resistance can be improved by a large thickness of the glass article, which, however, reduces the transmission of the article and greatly increases the heating of the glass during operation of the UV lamp. Excessive heating should be avoided, which in turn is positively influenced by very good transmission and low induced extinction. Excessively high temperatures impair safety due to the risk of user burns or explosions. In principle, the risk of burns can be reduced by greater distance, but this must be compensated with greater radiation intensity with the disadvantage again of stronger heat generation.

The invention also relates to a UV lamp and the use of the glass article in a UV lamp for disinfection, in particular in extreme environments, in particular for disinfecting sites of action, e.g. those touched by many people. It has proven advantageous to maintain a minimum distance between the surface to be disinfected and the glass article of 5 cm, in particular 7.5 cm or 10 cm. When using the glass article described herein, a power density of at least 1.0 mW/cm², at least 1.5 mW/cm², at least 2.5 mW/cm², at least 3.0 mW/cm² or at least 3.5 mW/cm² can be set at the site of action. The site of action is the surface to be disinfected. Optionally, the power density is at most 20 mW/cm², at most 15 mW/cm² or at most 10 mW/cm². In particular, the power density is the power that can be measured at the site of action as UV radiation, for example UV-C radiation, mediated by the UV lamp. In some embodiments, the site of action is periodically disinfected. This means that the site of action is not irradiated continuously, but only intermittently. For example, an irradiation interval can be triggered by touch or actuation by the user. For example, an irradiation interval may be at least 1 second, at least 5 seconds, at least 10 seconds, or at least 20 seconds. Optionally, an irradiation interval lasts at most 10 minutes, at most 5 minutes, at most 2 minutes, or at most 1 minute.

In some embodiments, the UV lamp and/or the glass article has a heat-optimized structure, wherein the thickness of the glass article and the UV transmission of the glass article are chosen in such a way that when a site of action 70 mm away from the glass article (disposed on the opposite side of the article with respect to the light source) is irradiated with a medium pressure mercury lamp at 120 W/cm and an arc length of 4 cm (e.g. Philips HOK 4/120) at a UVC power density of 17.27 mW/cm² for a duration of 5 seconds at an ambient temperature of 20° C., no temperature at the surface of the glass article facing the site of action exceeds 45° C. In some embodiments, the radiation passes perpendicularly through the glass article, i.e., the light enters the glass article substantially perpendicular to the surface facing the light source and/or the light exits the glass article substantially perpendicular to the surface of the glass article facing the site of action. For example, no temperature exceeds a value of 42.5° C., 40° C. or 37.5° C. In some embodiments, said temperature limits are not exceeded even after 10 seconds, 20 seconds, 30 seconds, 45 seconds, 60 seconds, 90 seconds, 120 seconds, 150 seconds or 180 seconds of irradiation. The property describes how strongly the glass article heats up when irradiated vertically with commonly used UV light sources. It is achieved that a UV lamp with a lamp cover made of the glass article does not become dangerously hot. UVC power density refers to the power density imparted by radiation in the UVC range (280 to 200 nm). Medium-pressure mercury lamps also emit light at other wavelengths, which are not taken into account here when considering UVC power density. The measurement is performed under ambient atmosphere. For clarification: the described property does not limit the UV lamp or the application of the glass article to medium-pressure mercury lamps.

In some embodiments, the glass article meets the requirements for the fracture pattern according to DIN EN 12150-1:2020-07. A whole article or a part of an article can be examined; in deviation from the specified standard, the article can be smaller than indicated there, as long as the area to be considered is exceeded. The area to be considered for the breakage pattern can be, for example, 40 mm×40 mm or 25 mm×25 mm. In some embodiments, the glass article breaks into not less than 25 pieces, for example not less than 30 pieces or not less than 40 pieces, under the above conditions. It is advantageous for the article to break into many pieces, since in the event of breakage the risk of injury is low if the pieces are small. The fracture pattern can be influenced, for example, by the choice of glass composition, cooling condition (thermal shrinkage), by adjusting stresses in the glass and/or by tempering the article.

In some embodiments, the invention relates to a glass article comprising an aluminum oxide containing silicate glass matrix, the glass matrix having less than 1 $SiO_2$-enriched glassy sphere of compositional inhomogeneities per 15 g of glass, further wherein the glass article has a thickness of at least 0.3 mm, for example at least 3 mm and/or up to 20 mm, further wherein the article has a compressive stress on at least one surface of at least 50 MPa and a fracture pattern characterized by fracture of an area of 40 mm×40 mm into not less than 25 pieces determined according to DIN EN 12150-1.

EXAMPLES

A comparison of the melting properties of different aluminum raw materials has been made by differential thermal analysis/thermal gravimetric analysis (DTA/TGA) according to DIN 51007:2019-04 (20° C.-1,500° C., heating rate 50 K/min). The sample batches consisted of only three components, which were the aluminum source, quartz powder and soda ash. In particular, the onset temperature of melting has been determined. In FIG. 1, the DTA/TG plots of gibbsite and boehmite are shown. The onset temperature of melting of gibbsite has been measured to be 1,071° C. and that of boehmite to be 1,210° C. This result shows that the gibbsite will start to melt much earlier than a boehmite. This means not only less energy consumption for the melting process but also that in the molten state the aluminum source can affect earlier its positive influence on the melting and dissolution behavior of the $SiO_2$ particles even before they reconfigure into cristobalite.

The melting process of the different aluminum sources has further been investigated by measuring their semi-sphere temperatures in a Hot-Stage-Microscopy (HSM) according to DIN 51730:2007-09 at a heating rate of 5 K/min on cylindrical samples of 3 mm diameter and 3 mm height. The semi-sphere temperature is defined as the temperature at which the sample has an approximately semi-spherical shape and reaches half of its original height at a shape factor of >0.98. It is a characteristic value for the rheological behavior at the beginning of the melting process. The sample batches consisted of boroalumosilicate glass mixtures like exemplified above, which differed only in the aluminum source. Two different types of gibbsite and a type of boehmite have been compared. The two gibbsite types differ in the BET surface, mean particle size, and density, wherein type 1 corresponds to the particularly preferred variants of the aluminum raw materials. The results are shown in the following table.

| Aluminum source | Semi-sphere temperature |
| --- | --- |
| Gibbsite (type 1) | 1,050° C. |
| Gibbsite (type 2) | 1,120° C. |
| Boehmite | 1,240° C. |

It can clearly be seen that the two gibbsite samples according to the invention outperform the boehmite sample. The values indicate that the gibbsite samples start to soften about 120-200° C. earlier than the boehmite sample. Hence, a glass composition will melt easier and at a lower temperature with gibbsite.

Figure 2:
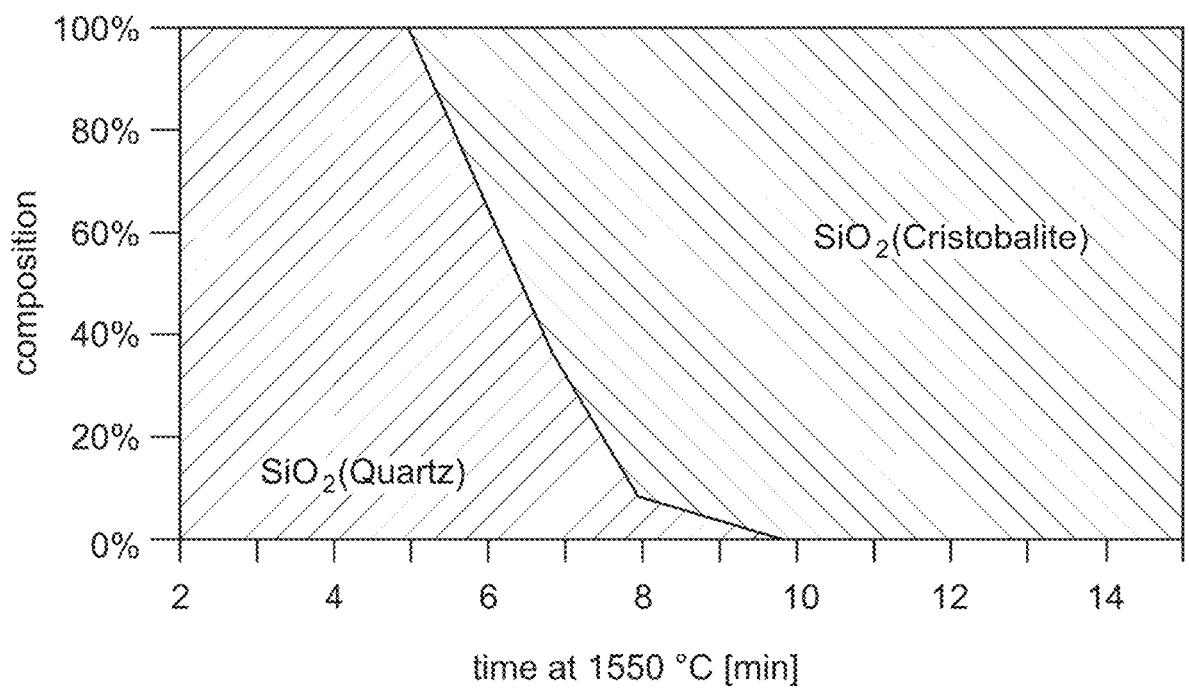
FIG. 2 is a plot of the change of the composition over time in a glass melt with gibbsite.

Further, the change of composition during melting of a glass raw material mixture comprising an aluminum source according to the invention has been investigated. For this experiment, 50 g samples of a mixture of raw materials for a glass have been prepared. The mixture has been put in a platinum crucible and heated to 1,550° C. Samples have been removed from the oven every minute. The samples have been quenched in water and then characterized by means of x-ray diffraction (XRD). The results of the measurements are shown in FIG. 2. It can be seen that after about 2 min the composition consists essentially of quartz. After about 5 min, the conversion of the quartz into cristobalite commences and after about 10 min the whole quartz phase has been converted into cristobalite. This demonstrates that the particularly troublesome cristobalite particles are already present after a short period of about ten minutes. These will then have to be melted and dissolved in the matrix during the further hours of the melting procedure.

Figure 3:
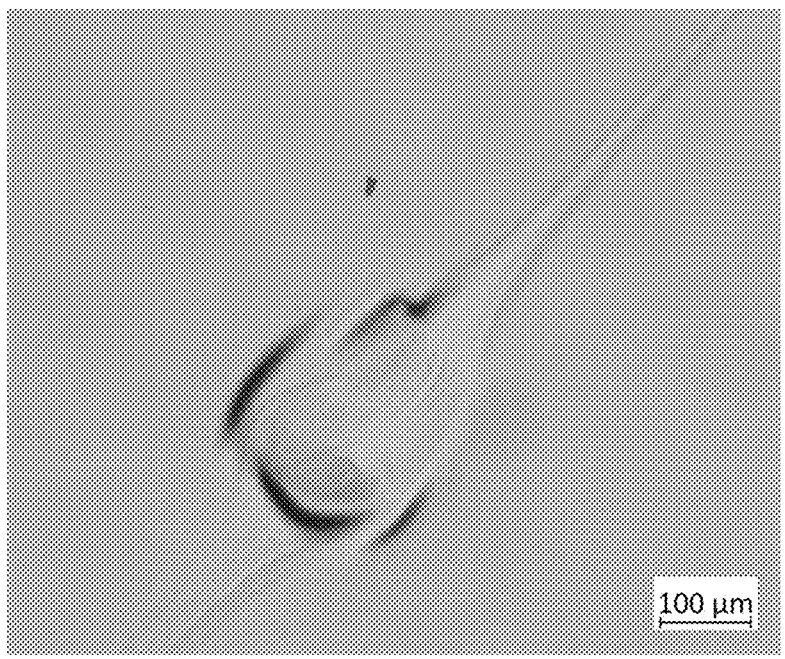
FIG. 3 is an example of a GCI sphere in an aluminum oxide containing silicate glass article in the form of a tube.

In FIG. 3, there is shown an example of a GCI sphere in an aluminum oxide containing silicate glass article in the form of a tube. As can be seen, the tube drawing process has caused a deformation of the GCI sphere in the glass. The particles of cristobalite crystals formed in the melting process have been stretched during the drawing process to an elongated ellipsoidal shape with an aspect ratio of about 1.3:1.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. At least one glass article, comprising an aluminum oxide containing silicate glass matrix, the glass matrix having less than 1 $SiO_2$-enriched glassy sphere of compositional inhomogeneities (GCI sphere) per 15 g of glass, wherein the glass matrix comprises the following components (in mol-% based on oxides):
   $68 \leq SiO_2 \leq 73$;
   $2 \leq Al_2O_3 \leq 5$;
   $12 \leq B_2O_3 \leq 24$;
   $0 \leq Li_2O \leq 2.8$;
   $1 \leq Na_2O \leq 4$;
   $0 < K_2O \leq 2$;
   $0 < CaO \leq 2$;
   $0 \leq SrO \leq 1$;
   $0 < BaO \leq 4$; and
   $0 < F- \leq 6$.

2. The at least one glass article of claim 1, wherein the glass matrix contains $B_2O_3$ in an amount of more than 15.0 mol-% and/or less than 12.0 mol-% of alkali metal oxides.

3. The at least one glass article of claim 2, wherein the glass matrix contains $B_2O_3$ in an amount of 15.0 mol-% or more.

4. The at least one glass article of claim 2, wherein the glass matrix contains less than 10.0 mol-% of alkali metal oxides.

5. The at least one glass article of claim 1, wherein the glass matrix has at least one of a thermal conductivity of at least 0.75 $W \cdot m^{-1} \cdot K^{-1}$ or a coefficient of thermal expansion of less than 5.0 ppm/K.

6. The at least one glass article of claim 1, wherein a coefficient of thermal expansion of the glass matrix is larger than a coefficient of thermal expansion of any GCI spheres by a factor of not more than 10.0.

7. The at least one glass article of claim 1, wherein the at least one glass article has a tube, sheet, or disc shape.

8. The at least one glass article of claim 1, wherein the at least one glass article has at least one of the following:
   a UV transmittance of at least 60% at a wavelength of 200 nm;
   a UV transmittance of at least 83% at wavelengths of at least one of 254 nm, 280 nm or 310 nm measured at a thickness of 1 mm; or
   a maximum deviation of UV transmittance of not more than 5.0% at a wavelength of at least one of 254 nm or 200 nm over an area of at least 10 $cm^2$.

9. The at least one glass article of claim 1, wherein the at least one glass article has a thickness of at least 0.3 mm.

10. The at least one glass article of claim 1, wherein the at least one glass article is thermally toughened or chemically toughened.

11. The at least one glass article of claim 1, wherein the at least one glass article has a compressive stress on at least one surface of at least 50 MPa.

12. The at least one glass article of claim 1, wherein the at least one glass article has a fracture pattern characterized by fracture of an area of 40 mm×40 mm into not less than 25 pieces determined according to DIN EN 12150-1.

13. The at least one glass article of claim 1, wherein a thickness of the at least one glass article and a UV transmission of the at least one glass article are chosen in such a way that when a site of action 70 mm away from the at least one glass article, disposed on an opposite side of the at least one glass article with respect to a light source, is irradiated with a medium pressure mercury lamp at 120 W/cm and an arc length of 4 cm at a UVC power density of 17.27 $mW/cm^2$ for a duration of 5 seconds at an ambient temperature of 20° C., no temperature at the surface of the at least one glass article facing the site of action exceeds 45° C.

14. The at least one glass article of claim 1, wherein the at least one glass article comprises from 5 to 5,000 glass articles to form a set of glass articles.

15. The at least one glass article of claim 1, wherein the glass matrix comprises the following composition in mol-% based on oxides:
   $68 \leq SiO_2 \leq 73$;
   $23 Al_2O_3 \leq 5$;
   $12 \leq B_2O_3 \leq 24$;
   $0 \leq Li_2O \leq 2.8$;
   $1 \leq Na_2O \leq 4$;
   $0 < K_2O \leq 2$;
   $0 < MgO \leq 6$;
   $0 < CaO \leq 2$;
   $0 \leq SrO \leq 1$;
   $0 < BaO \leq 4$;
   $0 < F- \leq 6$;
   $0 \leq Cl- \leq 0.5$;
   $3.5 \leq R_2O \leq 10$, wherein $R_2O$ comprises an alkali metal oxide; and
   $0 \leq RO \leq 6$, wherein RO comprises an alkaline earth metal oxide.

16. The at least one glass article of claim 15, wherein the source of $Al_2O_3$ is gibbsite.

17. An ultraviolet (UV) lamp for disinfecting surfaces, the UV lamp comprising:
   a UV light emitter configured to emit UV light with a wavelength of between 200 nm and 280 nm; and a cover associated with the light emitter such that UV light emitted by the light emitter passes through the cover, the cover comprising a glass comprising an aluminum oxide containing silicate glass matrix, the glass matrix having less than 1 $SiO_2$-enriched glassy sphere of compositional inhomogeneities (GCI sphere) per 15 g of glass, wherein the glass matrix comprises the following components (in mol-% based on oxides):
$68 \leq SiO_2 \leq 73$;
$2 \leq Al_2O_3 \leq 5$;
$12 \leq B_2O_3 \leq 24$;
$0 \leq Li_2O \leq 2.8$;
$1 \leq Na_2O \leq 4$;
$0 < K_2O \leq 2$;
$0 < CaO \leq 2$;
$0 \leq SrO \leq 1$;
$0 < BaO \leq 4$; and
$0 < F- \leq 6$.

18. The UV lamp of claim 17, wherein the cover has at least one of the following:
a UV transmittance of at least 60% at a wavelength of 200 nm;
a UV transmittance of at least 83% at wavelengths of at least one of 254 nm, 280 nm or 310 nm measured at a thickness of 1 mm; or
a maximum deviation of UV transmittance of not more than 5.0% at a wavelength of at least one of 254 nm or 200 nm over an area of at least 10 $cm^2$.

19. A method of making glass articles having an aluminum oxide containing silicate glass matrix, the method comprising:
providing a batch of raw materials, comprising a source of aluminum oxide and a source of $SiO_2$, wherein the source of aluminum oxide is gibbsite;
melting the batch to a temperature of more than 1,500° C. for no less than 3 hours;
forming a glass article from the melted batch; and
cooling the glass article to room temperature, wherein a glass matrix of the cooled glass article has less than 1 $SiO_2$-enriched glassy sphere of compositional inhomogeneities per 15 g of glass, wherein the glass matrix comprises the following components (in mol-% based on oxides):
$68 \leq SiO_2 \leq 73$;
$2 \leq Al_2O_3 \leq 5$;
$12 \leq B_2O_3 \leq 24$;
$0 \leq Li_2O \leq 2.8$;
$1 \leq Na_2O \leq 4$;
$0 < K_2O \leq 2$;
$0 < CaO \leq 2$;
$0 \leq SrO \leq 1$;
$0 < BaO \leq 4$; and
$0 < F- \leq 6$.

* * * * *